(12) United States Patent  
Ying et al.

(10) Patent No.: US 6,995,715 B2  
(45) Date of Patent: Feb. 7, 2006

(54) ANTENNAS INTEGRATED WITH ACOUSTIC GUIDE CHANNELS AND WIRELESS TERMINALS INCORPORATING THE SAME

(75) Inventors: Zhinong Ying, Lund (SE); Wan Shi, Hjärup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 7 days.

(21) Appl. No.: 10/630,082

(22) Filed: Jul. 30, 2003

(65) Prior Publication Data

US 2005/0024271 A1 Feb. 3, 2005

(51) Int. Cl.  
*H01Q 1/24* (2006.01)

(52) U.S. Cl. .................... 343/702; 455/89; 455/90
(58) Field of Classification Search .............. 455/89, 455/90, 129, 550, 575; 343/702  
See application file for complete search history.

(56) References Cited

U.S. PATENT DOCUMENTS

| | | | | |
|---|---|---|---|---|
| 5,555,449 A | * | 9/1996 | Kim ..................... 455/575.7 |
| 5,926,139 A | | 7/1999 | Korisch ................... 343/702 |
| 6,005,525 A | * | 12/1999 | Kivela ..................... 343/702 |
| 6,101,402 A | * | 8/2000 | Bartha et al. ............ 455/569.1 |
| 6,166,694 A | | 12/2000 | Ying ........................ 343/702 |
| 6,201,501 B1 | | 3/2001 | Arkko et al. .............. 343/702 |
| 6,353,443 B1 | | 3/2002 | Ying ........................ 345/702 |
| 6,442,400 B1 | | 8/2002 | Ying et al. |
| 6,496,149 B1 | * | 12/2002 | Birnbaum et al. ........ 343/702 |
| 6,569,795 B2 | | 5/2003 | Kono et al. ............... 501/135 |
| 6,693,596 B2 | * | 2/2004 | Wakui et al. ............. 343/711 |
| 2002/0187758 A1 | * | 12/2002 | Ylitalo et al. .............. 455/90 |
| 2003/0032443 A1 | | 2/2003 | Johnson et al. ........... 455/550 |
| 2003/0068987 A1 | | 4/2003 | Dufosse et al. ............. 455/90 |

FOREIGN PATENT DOCUMENTS

WO WO 02/35810 5/2002  
WO WO 00/74172 12/2002

OTHER PUBLICATIONS

Wong, Kin-Lu, *Planar Antennas for Wireless Communications*, Ch. 1, pp. 1-25, (Wiley, Jan. 2003).  
PCT International Search Report, International Application No. PCT/EP2004/008139 mailed Oct. 22, 2004.

* cited by examiner

*Primary Examiner*—Tho Phan  
(74) *Attorney, Agent, or Firm*—Myers Bigel Sibley & Sajovec PA

(57) ABSTRACT

Antennas and wireless terminals that incorporate the antennas include a radiating element that is disposed in and/or on an acoustic channel adapted to hold a speaker therein and guide the acoustic output to a desired location.

29 Claims, 3 Drawing Sheets

ANTENNAS INTEGRATED WITH ACOUSTIC GUIDE CHANNELS AND WIRELESS TERMINALS INCORPORATING THE SAME

FIELD OF THE INVENTION

The present invention relates to the field of communications, and, more particularly, to antennas and wireless terminals incorporating the same.

BACKGROUND OF THE INVENTION

The weight and size of wireless terminals has been decreasing with many contemporary wireless terminals being less than 11 centimeters in length. Correspondingly, there is an interest in small antennas that can be utilized as internally mounted antennas for wireless terminals. Inverted-F antennas, for example, may be well suited for use within the confines of wireless terminals, particularly wireless terminals undergoing miniaturization with a desire for increasingly larger displays. Typically, conventional inverted-F antennas include a conductive element that is maintained in a spaced apart relationship with a ground plane. Exemplary inverted-F antennas are described in U.S. Pat. Nos. 6,166,694 and 6,353,443, which are incorporated herein by reference in their entirety.

Conventionally, PIFA configurations have branched structures such as described in U.S. Pat. No. 5,926,139, and position the PIFA a relatively large distance, typically from about 7–10 mm, from the ground plane to radiate effectively. Kin-Lu Wong, in *Planar Antennas for Wireless Communications*, Ch. 1, p. 4, (Wiley, January 2003), illustrates some potential radiating top patches for dual-frequency PIFAS. The contents of each of these references are hereby incorporated by reference in their entirety herein.

It may be desirable for a wireless terminal to operate within multiple frequency bands in order to utilize more than one communications system, typically each operating in different band segments within a 800 MHz–6000 MHz frequency range. For example, Global System for Mobile communication (GSM) is a digital mobile telephone system that typically operates at a low frequency band, such as between 880 MHz and 960 MHz. Digital Communications System (DCS) is a digital mobile telephone system that typically operates at high frequency bands, such as between 1710 MHz and 1880 MHz. In addition, global positioning systems (GPS) or Bluetooth systems use frequencies of 1.575 or 2.4–2.48 GHz. The frequency bands allocated for mobile terminals in North America include 824–894 MHz for Advanced Mobile Phone Service (AMPS) and 1850–1990 MHz for Personal Communication Services (PCS). Other frequency bands are used in other jurisdictions.

Some conventional housing designs position an internal (PIFA) antenna at the rear top portion of a mobile wireless device. In addition, in order to free up front real estate, such as to allow for larger displays, some configurations position a speaker at the rear or backside of the device and use an acoustic channel to route or guide the sound to the top-front side of the device.

Despite the foregoing, particularly as increased radio function is accommodated, such as for GPS, Bluetooth, and/or W-LAN modes, there remains a need for improved and/or alternative antenna configurations to provide multi-band operation.

SUMMARY OF THE INVENTION

Embodiments of the present invention provide antennas for communications devices and wireless terminals. Embodiments of the invention include an integrated antenna and acoustic channel. Thus, for example, the antenna can be an antenna that is integral to the acoustic channel whereby the antenna radiating element can be held by (typically abutting against at least a portion of the wall(s)) and/or formed on or in the wall(s) of an acoustic channel. In particular embodiments, the antenna can be a secondary antenna (supplementing a primary antenna) having about a ¼ wavelength at a desired (typically high) frequency band. The antenna may be a planar inverted-F antenna (PIFA) element.

Certain embodiments are directed to an antenna subassembly having an antenna that is integral with an acoustic channel and has a resonant frequency (or bandwidth) of operation. The antenna subassembly includes: (a) an acoustic channel formed of a (typically non-conductive) substrate material, the acoustic channel having a wall with an enclosed space and an associated length and width, the acoustic channel adapted, during operation, to guide the output of a speaker to a target location (typically a forward location at an end portion of the acoustic channel); and (b) an antenna having a radiating element, the radiating element being integrated in the acoustic channel.

In particular embodiments, the antenna element is formed on and/or in a portion of the wall of the acoustic channel and at least a portion of the element substantially conforms to the shape of the channel wall.

Other embodiments are directed to a wireless terminal. The wireless terminal includes: (a) a housing configured to enclose a transceiver that transmits and receives wireless communications signals; (b) an acoustic channel having a wall with an enclosed space and an associated length and width, the acoustic channel adapted, during operation, to guide the output of a speaker to a location in the housing proximate at an end portion of the acoustic channel; (c) an antenna having a radiating element, the element disposed in the acoustic channel; and (d) a speaker in communication with the acoustic channel.

Still other embodiments are directed to a wireless terminal with two discrete internal antennas for multi-band operation. The wireless terminal includes: (a) a housing having opposing forward and rear portions, the housing configured to hold a transceiver that transmits and receives wireless communications signals; (b) an acoustic channel having a wall and an associated length and width, the acoustic channel positioned in the housing and adapted, during operation, to guide the output of a speaker to the forward portion of the housing; (c) an antenna cavity disposed on the rear portion of the housing and positioned to overlie and enclose the acoustic channel; (d) a secondary planar inverted F-antenna having a conductive element, the conductive element disposed in the acoustic channel and electrically connected with the transceiver; (e) a primary planar inverted F-antenna having a conductive element positioned in the housing antenna cavity and electrically connected with the transceiver; and (f) a speaker in communication with the acoustic channel.

In certain embodiments, the two planar inverted-F antennas are configured to provide operation at a plurality of resonant frequency bandwidths of operation (typically between about 2–4). In certain embodiments, the antennas can be positioned between about 3–10 mm from a ground plane that may be provided by a printed circuit board (overlying or underlying the antenna element).

In particular embodiments, the primary antenna is configured to operate at a first (which may be low) band of between about 824–894 MHz and at least one additional second (which may be high) band of between about 1850–1990 MHz.

Still other embodiments are directed to methods of operating a wireless terminal. The methods include transmitting sound from a speaker in the wireless terminal to outside the wireless terminal via an acoustic channel that has an integrated antenna.

These and other embodiments will be described further below.

DETAILED DESCRIPTION

Figure 1:
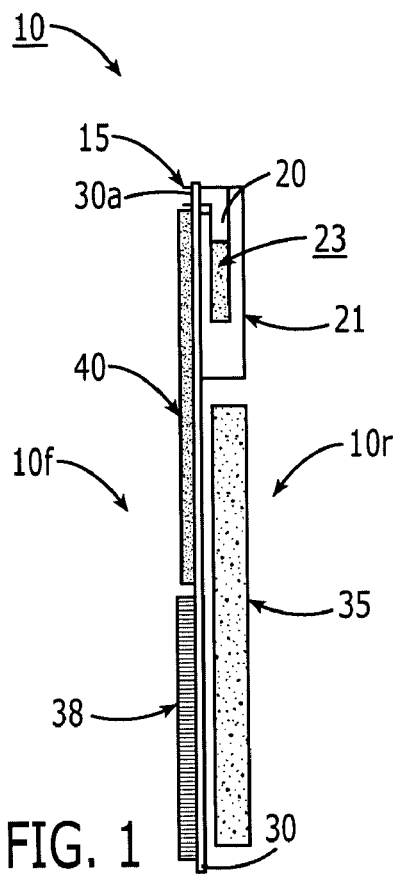
FIG. 1 is a side view of an exemplary wireless terminal device according to embodiments of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain antenna embodiment, features or operation of one antenna embodiment can apply to others.

In the drawings, the thickness of lines, layers, features, components and/or regions may be exaggerated for clarity. It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. However, it is noted that the presence of a coating or film layer on a substrate does not exclude the conductive element from being "directly formed" on the substrate albeit over the coating or film thereon.

The terms "integrated antenna" or "integral antenna" refers to antennas that are integrated with an acoustic channel and encompasses an antenna element that has at least a portion of the radiating element configured so that it is placed, formed, and/or resides (and/or is defined by): in an acoustic channel, on and/or in the wall(s) of the acoustic channel, and/or on an inner surface of the wall(s) of the acoustic channel. Thus, embodiments of the invention include an antenna that is "integrated" or "integral" with the acoustic channel so as to include configurations where at least a portion of the radiating antenna element is etched, printed or otherwise formed on, defined by, attached to, and/or supported by the substrate forming the acoustic channel. The integral antenna may be configured so that the shape of the acoustic channel defines at least a portion of the shape of the antenna and/or so that the shape of a portion of the antenna defines a portion of the interior cavity of the acoustic channel. The integral antenna element may be configured to align with the wall(s) of the acoustic channel to define a portion of the channel (with a substantially flush profile) or to attach to the wall (typically an inner surface) of the channel and extend a distance into the cavity of the channel. The integrated antenna may comprise a radiating element such as a conductive element and/or a dielectric (i.e., block) element. As such, the antenna may be any suitable internal antenna configuration such as a dielectric resonant antenna "DRA" which can operate without a conductive element or a patch or conventional antenna configurations with conductive elements. Dielectric resonator antennas are well known to those of skill in the art. Examples of dielectric resonator antennas may include those described in one or more of U.S. Pat. Nos. 6,569,795; 6,515,635; 6,496,149; and 6,458,734, the contents of which are hereby incorporated by reference as if recited in full herein.

In addition, although certain embodiments are described with respect to a planar inverted F-antenna, the antenna may not be strictly "planar" although in the vernacular of the art, it might still be referred to as a planar inverted-F antenna.

The term "comprises, comprising" and derivatives thereof, means that the recited feature, operation, integer, component, step, and the like is present but does not exclude or preclude the presence or addition of one or more alternative or different features, integers, steps, components or groups.

Figure 2:
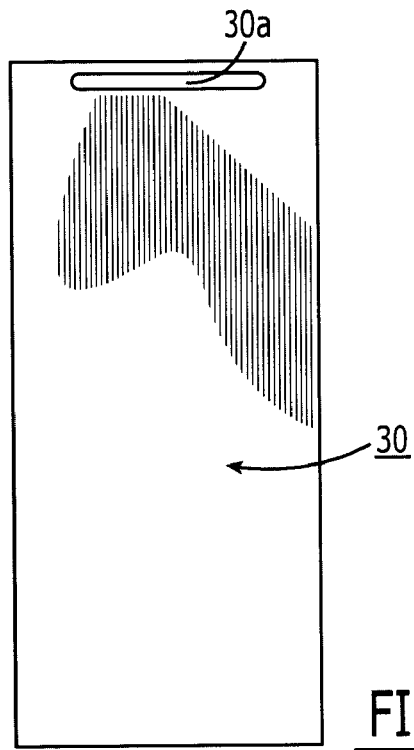
FIG. 2 is a front view of a printed circuit board having an aperture for receiving an acoustic channel therein according to embodiments of the present invention.

Embodiments of the present invention will now be described in detail below with reference to the figures. FIG. 1 illustrates a wireless device 10 that includes an acoustic channel 15 with an integrated antenna 20 and a speaker 23 in communication with the channel 15. The speaker 23 may be disposed in the channel 15, but is typically larger than the channel 15 and can be configured to reside below or outside the channel 15 but configured to be in acoustic communication with the channel 15. As shown, the device 10 can also include an antenna cavity 21 that can be configured to substantially encase or enclose the underlying acoustic channel 15 therein (and may, in certain embodiments, also encase a second antenna as will be discussed further below). The device 10 may also include a printed circuit board 30, a battery 35, a keypad 38, and a display 40. The device 10 can include opposing first and second primary surfaces, which may descriptively be termed forward 10f and rear 10r surfaces or portions, respectively. The printed circuit board 10 can include an acoustic channel aperture 30a (see FIG. 2) that receives a portion of the acoustic channel 15 therein and/or therethrough. The channel 15 may also terminate so that it is substantially flush with the rear side of the printed circuit board (not shown) proximate the aperture 30a (not shown). In operation, the acoustic channel 15 guides or routes the acoustic output from the speaker 23 to a desired location (shown as the upper forward side of the device above the display 38).

As shown in FIG. 1, the acoustic channel 15 can be configured to reside proximate the rear portion of the printed circuit board 30 with the channel 15 extending vertically a distance proximate the speaker 23 and then turning about a forwardmost upper edge portion to cause the channel 15 to approach and/or enter the aperture 30a in a substantially horizontal orientation when the device 10 is held as shown in FIG. 1. The forwardmost portion of the channel 15 may reside above the display 38. The speaker 23 and/or channel 15 may be oriented in different configurations to guide the acoustic output from the speaker 23 to the location(s) desired in and/or out of the wireless device 10. In addition, the channel 15 may extend to the front or forward surface of the device 10 without extending through the printed circuit board 30, such as by extending over or around an edge or surface thereof (not shown). The shape of the inner passage or gap space of the channel 15 can be selected to provide suitable sound quality and/or shape of the antenna element 20.

Figure 3A:
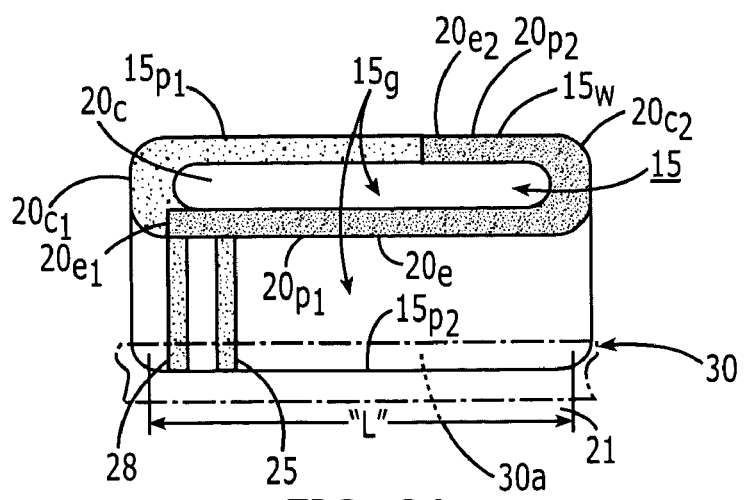
FIG. 3A is a cross section top view of an antenna element in the acoustic channel according to embodiments of the present invention.

FIG. 3A illustrates that the antenna 20 can be configured as a PIFA antenna with at least a portion of the radiating element 20e formed on and/or in a selected portion of the substrate of the acoustic channel wall 15w. The radiating element 20e can be a conductive element for the PIFA antenna configuration. The radiating element 20e may be an adaptive body such as dielectric block element for dielectric block antennas (not shown). FIG. 3A illustrates that the antenna 20 has a cavity 20c that extends a distance into the channel cavity 15g with a portion of the conductive element 20e residing on the wall of the channel 15. In operation, acoustic transmissions can travel both through the antenna cavity 20c and the channel cavity 15g. In the embodiment shown in FIG. 3A, the antenna 20 is located at a top portion of the acoustic channel 15 proximate the aperture 30a of the printed circuit board 30 (above the display 38). The antenna element 20e may be configured with a minor portion of the element held on the inside wall of the upper wall portion of the channel 15 with the signal and ground leads 28, 25, respectively, extending through the other opposing side of the channel in the direction of the printed circuit board 30.

Figure 3B:
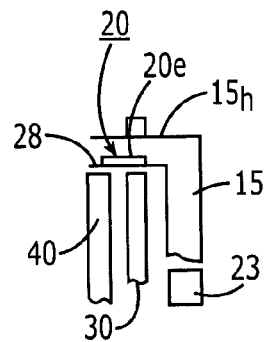
FIGS. 3B–3G are side view partial cutaway schematic illustrations of exemplary alternative locations of an integrated antenna and acoustic channel according to embodiments of the present invention.
Figure 3C:
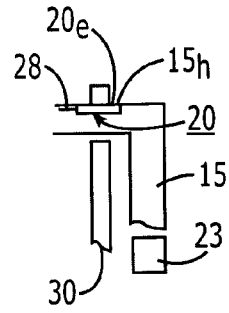
Figure 3D:
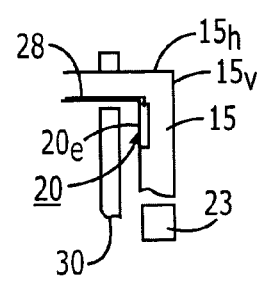
Figure 3E:
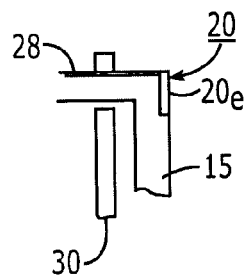

FIGS. 3B–3G illustrate exemplary locations for the radiating element 20e about the acoustic channel 15. FIG. 3B illustrates that the antenna 20 may be positioned proximate the horizontal segment 15h of the channel 15 (shown as on the lower surface of the channel 15) and extends a distance sufficient so that at least a portion of the element 20e resides on the forward side of the printed circuit board 30 above the display 38. In this embodiment, the antenna element 20e may be disposed and/or printed onto the outer edge portion of the acoustic channel 15. FIG. 3C also illustrates that the antenna 20 may be positioned proximate the horizontal segment 15h with a portion of the element 20e positioned on the upper surface of the channel 15. FIG. 3D shows the antenna 20 positioned below the horizontal segment 15h at an upper portion of the vertical segment 15v. FIG. 3E shows the antenna 20 at a top edge of the vertical segment 15v of the acoustic channel 15.

Figure 3F:
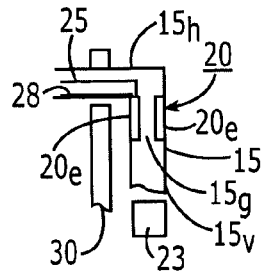
Figure 3G:
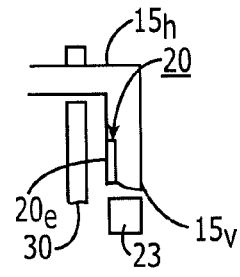

FIG. 3F illustrates that the antenna 20 can be positioned about the vertical segment 15v of the channel 15 and may continuously extend about a major portion of the perimeter of the cavity 15g. FIG. 3G illustrates that the antenna 20 may be positioned about a lower portion of the channel proximate the speaker 23 input (port). The channel 15 can be an elongate tubular channel with a length of about 20–50 mm and a width that is less than about 10 mm, and typically between about 2–5 mm. As shown, the tubular channel 15 can have a wall (which may be a plurality of cojoined walls or a single wall) that defines the interior air gap space 15g. The channel 15 may be configured as a unitary member or as a plurality of joined segments. In certain embodiments, the conductive element 20e can be disposed and/or formed on the wall such that the two conductive opposing end portions of the element $20e_1$, $20e_2$ are spaced apart a distance so as to not contact.

The antenna 20 can be configured to provide about a ¼ wavelength antenna length at a desired frequency and/or selected frequency bandwidth and may be configured as a non-PIFA antenna configuration. In certain embodiments, the antenna element 20e may configured in size to be less than about half the size of conventional PIFA antennas with conductive elements, and may be even smaller, such as about 20–30% the conventional PIFA sizes (typically less than about 1/10 of wavelength). For example, the element 20e may have an associated radiating area (length by width) that is less than about 250 mm. The antenna element 20e may be configured to extend substantially about the entire cavity, i.e., at least a major portion of the inner perimeter of a portion of the channel 15 or discrete portions thereof. For example the element 20e may be configured so as to extend about a length that corresponds to one side, two sides, three sides, or greater than three sides of the channel cavity. In particular embodiments, the antenna 20 can have a radiating (i.e., conductive and/or dielectric) element 20e area that is less than about 30 mm height×less than about 5 mm width (or the reverse). In certain embodiments, the antenna element 20e may have an area (LAW or WAX) of about 25–30 mm by about 3–4 mm, and may be positioned about 2–3 mm from ground.

The acoustic channel 15 may be formed of a non-conductive substrate. In certain embodiments, the acoustic channel 15 can be formed of a low-microwave loss material such as a polymer, copolymer, elastomer (or plastic) and/or ceramic material, or mixtures thereof. At least a portion of the metallic conductive element 20e may be applied as a surface mount strip, sheet and/or flex circuit or formed directly on and/or in the substrate via printing, inking, vapor deposition, etching, or other suitable technique, including combinations of the above.

In certain embodiments, a sheet or strip of metallic material (such as copper) may be disposed in the channel 15 and configured so that the sheet or strip of metallic material, in position, substantially takes the shape of at least a portion of the inner wall 15w and is frictionally engaged therewith to reside about a desired location in the channel 15. The sheet or strip of metallic material may be configured to be a unitary component that overlies a portion of the inner channel wall 15w or can be formed on or with portions of a flexible non-conductive substrate such as a flex film layer. For example, a sheet of material with the conductive element thereon can be rolled with a width that is less than that of the channel 15. The rolled sheet can be inserted into the channel 15 and allowed to release to unwind and conform to the shape of the channel wall(s) (not shown). Either way, the strip or sheet may be configured so as to substantially conform to a portion of the inner wall 15w leaving the channel interior gap space 15g substantially open (and/or by providing its own transmission cavity) so as to not unduly interfere with acoustic transmission of the speaker output to the forward side of the device along the acoustic channel 15.

FIG. 3A illustrates that the antenna 20 includes a signal feed 28 (that may be provided by a signal pin) that connects the antenna element 20e to the signal port or feed and the other may be a ground leg 25 (that may be provided by a ground pin 25) that is grounded, such as by connecting to a ground plane provided by the printed circuit board 30. The ground feed 25 is optional, but may, in certain embodiments be provided for matching purposes as will be well known to those of skill in the art.

The signal and, where used, ground feed 28, 25, respectively, may connect to the antenna through the aperture 30e in the printed circuit board 30 to the transceiver and/or ground. However, other signal and/or ground connection configurations may also be used. For example, where a separate (typically primary) antenna is used and disposed in the antenna cavity 21 (as will be discussed further below), the antenna 20 may be configured to electrically connect to the primary antenna signal and/or ground feed connectors or legs, respectively.

As shown in FIG. 3A, in certain embodiments, the tubular channel 15 can be configured with two major opposing substantially planar portions $15p_1$, $15p_2$ and two side curved portions that close the channel 15 to direct the speaker acoustic output to the desired location without undue loss in quality or sound level. The antenna element 20e similarly includes a major planar portions $20p_1$, and a minor curved portion that terminates into a minor planar portion $20p_2$. This configuration allows the antenna element 20e to be formed as a spiral shape PIFA antenna against portions of the channel wall. Exemplary spiral shaped PIFAs are described in U.S. Pat. Nos. 6,166,694 and 6,353,443, the contents of which are hereby incorporated by reference as if recited in full herein.

As shown in FIG. 3A, the antenna element 20e extends and conforms to the shape of a portion of the wall and wraps about one of the side portions in a curvilinear (shown as arcuate or concave configuration) and extends across a portion of the wall on the opposing side of the gap 15g defined by the channel 15. In this embodiment, the antenna and supporting substrate portion only occupies a subset of the overall channel (does not cover the entire cavity wall). Other tubular or enclosed channel configurations and/or antenna element 20e configurations can be used. The tubular channel 15 shape can be used to provide acoustic sound quality for the speaker 23 and may be cylindrical, conical, frustoconical, or other desired shape.

The element may be configured to provide a secondary antenna having GPS or Bluetooth capability and/or an operational frequency of about 1.575 or between about 2.4–2.48 GHz. Thus, for example the secondary element may radiate at about 1570 MHz.

Figure 4A:
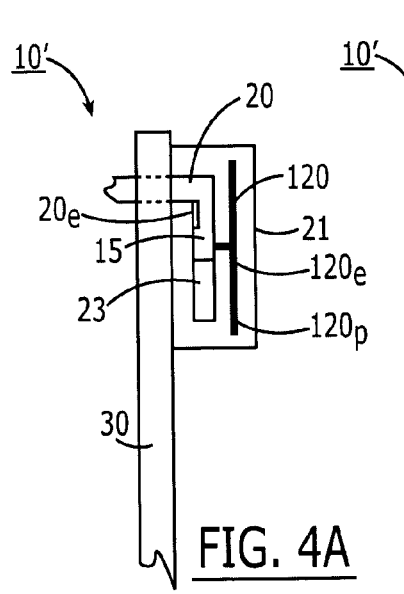
FIGS. 4A–4C are partial side views of dual antenna configurations according to embodiments of the present invention.
Figure 4B:
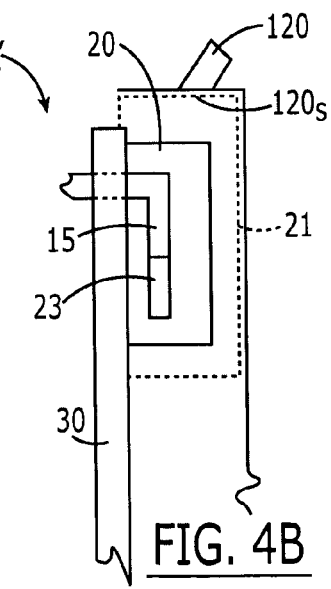
Figure 4C:
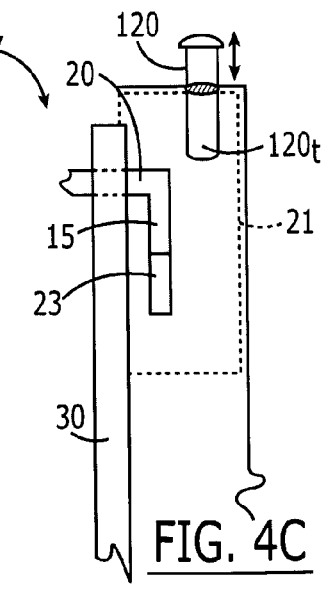

In certain embodiments, as illustrated with respect to FIGS. 4A–4C, the device 10' can be configured with two antennas: namely, the acoustic-channel mounted antenna 20 (hereinafter the "secondary antenna") and a primary antenna 120. Each can be held inside the antenna cavity 21. FIG. 4A illustrates that the primary antenna 120 may be a (multi or single band) PIFA antenna. FIG. 4B illustrates that the primary antenna 120 may be an external antenna, such as a "shark-fin" or stub configuration. FIG. 4C illustrates that the primary antenna 120 may be a translatable antenna.

The primary antenna 120 can be configured to operate at a plurality of selected resonant frequency bands. Antennas 20, 120 according to embodiments of the present invention may be useful in, for example, multiple mode wireless terminals that support two or more different resonant frequency bands, such as world phones and/or dual mode phones. In certain embodiments, at least one of the antennas 20, 120 of the present invention can operate in a low frequency band with the other antenna configured to operate at the at least one high frequency band. The terms "low frequency band" or "low band" are used interchangeably and, in certain embodiments, include frequencies below about 1 GHz, and typically comprises at least one of 824–894 MHz or 880–960 MHz. The terms "high frequency band" and "high band" are used interchangeably and, in certain embodiments, include frequencies above 1 GHz, and typically frequencies between about 1.5–2.5 GHz. Frequencies in high band can include selected ones or ranges within about 1700–1990 MHz, 1990–2100 MHz, and/or 2.4–2.485 GHz.

In certain embodiments, the secondary antenna 20 may be configured to provide resonance for a global positioning system (GPS) as the terminal into which this antenna is to be built, can include a GPS receiver. GPS operates at approximately 1,575 MHz. GPS is well known to those skilled in the art. GPS is a space-based triangulation system using satellites and computers to measure positions anywhere on the earth. Compared to other land-based systems, GPS is less limited in its coverage, typically provides continuous twenty-four hour coverage regardless of weather conditions, and is highly accurate. In the current implementation, a constellation of twenty-four satellites that orbit the earth continually emit the GPS radio frequency. The additional resonance of the antenna as described above permits the antenna to be used to receive these GPS signals.

As used herein, the term "wireless terminal" may include, but is not limited to, a cellular wireless terminal with or without a multi-line display; a Personal Communications System (PCS) terminal that may combine a cellular wireless terminal with data processing, facsimile and data communications capabilities; a PDA (personal digital assistant) that can include a wireless terminal, pager, internet/intranet access, web browser, organizer, calendar and/or a GPS receiver; and a conventional laptop and/or palmtop receiver or other appliance that includes a wireless terminal transceiver. Wireless terminals may also be referred to as "pervasive computing" devices and may be mobile terminals including portable radio communication equipment. The term "portable radio communication equipment" (which can also be referred to interchangeably as "a mobile radio terminal") includes all portable equipment such as mobile telephones, pagers, and communicators, including, but not limited to, smart phones, electronic organizers, and the like.

It will be understood by those having skill in the art of communications devices that an antenna is a device that may be used for transmitting and/or receiving electrical signals. During transmission, an antenna may accept energy from a transmission line and radiate this energy into space. During reception, an antenna may gather energy from an incident wave and provide this energy to a transmission line. The amount of power radiated from or received by an antenna is typically described in terms of gain.

Voltage Standing Wave Ratio (VSWR) relates to the impedance match of an antenna feed point with a feed line or transmission line of a communications device, such as a wireless terminal. To radiate radio frequency energy with minimum loss, or to pass along received RF energy to a wireless terminal receiver with minimum loss, the impedance of a wireless terminal antenna is conventionally matched to the impedance of a transmission line or feed point. Conventional wireless terminals typically employ an antenna that is electrically connected to a transceiver operatively associated with a signal processing circuit positioned on an internally disposed printed circuit board. In order to increase the power transfer between an antenna and a transceiver, the transceiver and the antenna may be interconnected such that their respective impedances are substantially "matched," i.e., electrically tuned to compensate for undesired antenna impedance components, to provide a 50-Ohm (Ω) (or desired) impedance value at the feed point.

A secondary antenna such as ones formed as an inverted-F antenna 20 and/or a primary inverted-F antenna 120*p* (FIG. 4A) according to some embodiments of the invention can be assembled into a device with a wireless terminal such as a radiotelephone terminal with an internal ground plane and transceiver components operable to transmit and receive radiotelephone communication signals. The ground plane may be about 40 mm wide and about 125 mm in length.

Figure 5:
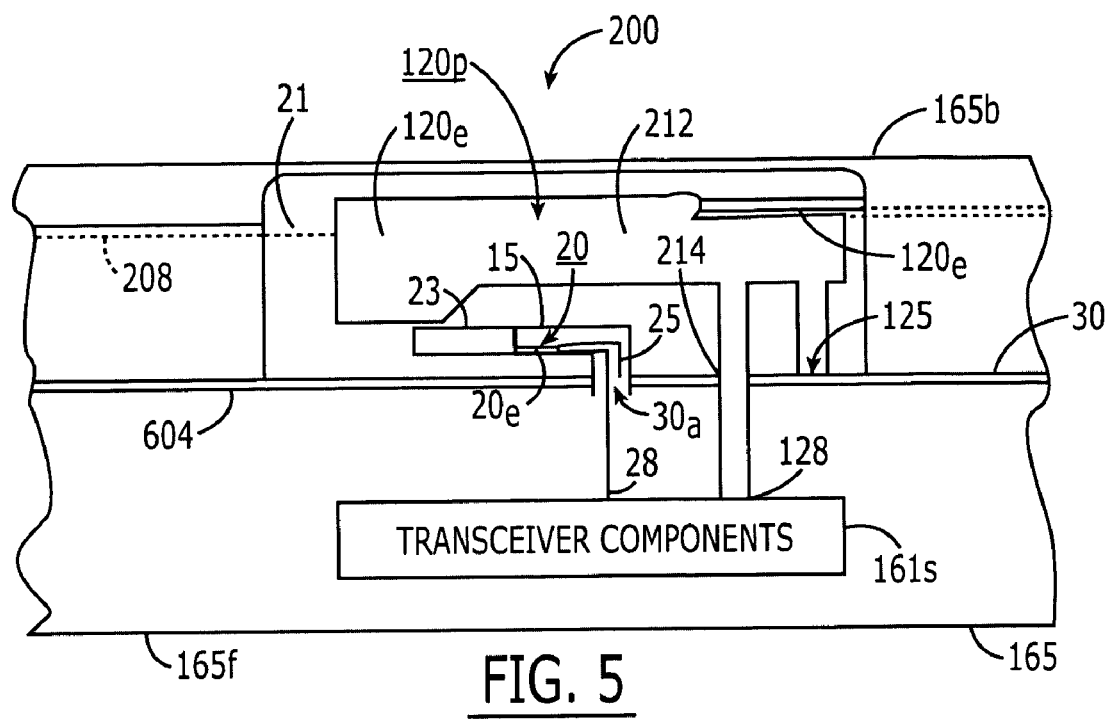
FIG. 5 is a partial side view of a wireless device according to embodiments of the present invention.

As shown in FIG. 5, the (PIFA) secondary antenna 20 and/or primary antenna 120*p* can be disposed substantially parallel to a ground plane 225 and is connected to the ground plane and the transceiver components via respective ground and signal feeds 25, 28 and 125, 128, respectively. Although shown as a separate component, the transceiver 161*s* and/or components thereof may be integrated into the printed circuit board 30. The primary antenna 120*p* may be formed or shaped with a certain size and a position with respect to the ground plane so as to conform to the shape of the radiotelephone terminal housing or a subassembly therein. For example, the antenna 120*p* may be placed on a substrate that defines a portion of the outer wall of the housing itself thereby providing the outer wall of the enclosed acoustic antenna cavity 21. In other embodiments, the antenna cavity 21 may be formed by a separate housing component that encloses both the primary and secondary antennas 20, 120.

In addition, it will be understood that although the term "ground plane" is used throughout the application, the term "ground plane", as used herein, is not limited to the form of a plane. For example, the "ground plane" may be a strip or any shape or reasonable size and may include non-planar structures such as shield cans or other metallic objects.

The antenna conductive element of the primary antenna 120*p* and/or secondary antenna 20 may be provided with or without an underlying substrate dielectric backing, such as, for example, FR4 or polyimide. In addition, the antenna 120*p* may include air gaps in the spaces between branches or segments. Alternatively, the spaces may be at least partially filled with a dielectric substrate material or the conductive pattern formed over a backing sheet. Furthermore, an inverted-F conductive element forming the secondary antenna 20, according to embodiments of the present invention, can be held by or disposed on and/or within a dielectric substrate, such as the acoustic channel wall(s) as described above.

Referring to FIG. 4A and FIG. 5, the antenna element 20*e*, 120*e* may be formed of copper and/or other suitable conductive (typically metallic) material. For example, conductive element branches, where used may be formed from copper sheet. Alternatively, the conductive element branches may be formed from copper layered on a dielectric substrate. However, conductive elements 20*e*, 120*e* for inverted-F conductive elements according to the present invention may be formed from various conductive materials and are not limited to copper as is well known to those of skill in the art. As described above, the antenna 20 and/or 120*p* can be fashioned in any suitable manner, including, but not limited to, metal stamping, cutting or forming and/or forming the conductive material in a desired pattern on a flex film or other substrate whether by depositing, inking, painting, molding, photoresist, etching or otherwise providing conductive material traces onto the target substrate material. In dielectric antenna configurations, dielectric elements (such as ceramics) may be used.

It will be understood that, although antennas according to embodiments of the present invention are described herein with respect to wireless terminals, embodiments of the present invention are not limited to such a configuration. For example, antennas according to embodiments of the present invention may be used within wireless terminals that may only transmit or only receive wireless communications signals. For example, conventional AM/FM radios or any receiver utilizing an antenna may only receive communications signals. Alternatively, remote data input devices may only transmit communications signals.

Referring to FIG. 5, an example of a wireless terminal 200 is illustrated. As shown, the secondary antenna 20 includes a radiating element 20*e* that is held in the acoustic channel 15. In certain embodiments, the radiating element 20*e* can be maintained in spaced apart relationship with a ground plane 225 that is typically held on a printed circuit board 30. The antenna element 20*e* can be in communication with a signal feed 28 and a ground feed 25. The signal and ground feeds 28, 25 can be positioned adjacent each other and disposed on a common edge portion of the element 20*e*. In certain embodiments, the signal and ground feeds 28, 25 are positioned proximate a common outer edge portion of the element 20*e*. The term "common outer edge portion" means the signal and ground feeds are positioned adjacent each other near or on an outside or end portion of the element 20*e* (with no conductive or radiating element spacing them apart). This configuration is in contrast to where the ground is positioned on a first portion of the element and the signal across from the ground with an expanse of conductive element that separates the signal and feed (such as for center fed configurations).

Still referring to FIG. 5, the primary antenna 120*p* may include a conductive element 120*e* that is maintained in spaced apart relationship with the ground plane 125 that is, again, typically held on the printed circuit board 30. The antenna element 120*e* can also be in communication with a signal feed 128 and a ground feed 125. The signal and ground feeds 128, 125 can be positioned adjacent each other and disposed on a common edge portion of the element 120*e*. In certain embodiments, the signal and ground feeds 128, 125 are also positioned proximate a common outer edge portion of the element 120*e*. Alternatively, the ground 125 can be positioned on a first portion of the element and the signal 128 across from the ground with an expanse of conductive element that separates the signal and feed (such as for center fed configurations).

A conventional arrangement of electronic components that allow a wireless terminal 200 to transmit and receive wireless terminal communication signals will be described in further detail. As illustrated, an antenna 20 and/or 120*p* for receiving and/or transmitting wireless terminal communication signals is electrically connected to transceiver circuitry components 161*s*. The components 161*s* can include a radio-frequency (RF) transceiver that is electrically connected to a controller such as a microprocessor. The controller can be electrically connected to a speaker that is configured to transmit a signal from the controller to a user of a wireless terminal. The controller can also electrically connected to a microphone that receives a voice signal from a user and transmits the voice signal through the controller and transceiver to a remote device. The controller can be electrically connected to a keypad and display that facilitate wireless terminal operation. The design of the transceiver, controller, and microphone are well known to those of skill in the art and need not be described further herein.

The wireless communication device 200 shown in FIG. 5 may be a radiotelephone type radio terminal of the cellular or PCS type, which makes use of an antenna 20 according to embodiments of the present invention. As shown, the device 200 includes a signal feed 128 that extends from a signal receiver and/or transmitter (e.g., an RF transceiver) comprising electronic transceiver components 161s. The ground plane 125 serves as the ground plane for the planar inverted-F antenna 120p. The antenna 120p may include a dielectric substrate backing shown schematically by dotted line 208. The antenna 120p can include wrapped portions 212, which serve to connect the conductive element to the signal and ground feeds 128, 125. The ground feed 125 is connected to the ground plane 225. The antenna 120p and/or 20 can be installed substantially parallel to the ground plane 225, subject to form shapes, distortions and curvatures as might be present for the particular application, as previously discussed. The signal feed(s) 28, 128 can pass through an aperture 214 in the ground plane 225 and is connected to the transceiver components 161s. The transceiver components 161s, the ground plane 225, and the primary and secondary inverted-F antenna 120p can be enclosed in a housing 165 for the wireless (i.e., radiotelephone) terminal. The housing 165 can include a back portion 165b and front portion 165f. The wireless device 200 may include other components such as a keypad and display as noted above. The ground plane 225 may be configured to underlie or overlie the antennas 20, 120p.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An antenna subassembly comprising an integrated antenna and acoustic channel having a resonant frequency of operation, comprising:
   an acoustic channel formed of substrate material, the acoustic channel having a wall with an enclosed space and an associated length and width and opposing upper and lower end portions, the acoustic channel adapted, during operation, to guide the sound output of a speaker to a target location;
   an antenna that is integrated with the acoustic channel;
   a speaker in communication with the acoustic channel and disposed proximate the lower end portion of the acoustic channel; and
   a printed circuit board having forward and rearward primary surfaces and an aperture extending therethrough, the acoustic channel upper end portion merging into or extending through the printed circuit board aperture to guide the sound output from the speaker to exit in a forward direction.

2. An antenna subassembly according to claim 1, wherein the acoustic channel is formed of a substrate material that is non-conductive and has a wall with that defines a continuous enclosed elongate space along the acoustic channel length and width, and wherein the antenna comprises a conductive element formed on and/or in a portion of the wall of the acoustic channel.

3. An antenna subassembly according to claim 2, wherein at least a portion of the conductive element is conformal to the shape of a portion of the acoustic channel wall, and wherein the acoustic channel is generally tubular with a width that is bout 10 mm or less and a length that is about 50 mm or less.

4. An antenna subassembly according to claim 2, wherein the conductive element is a planar inverted F-antenna.

5. An antenna subassembly according to claim 4, wherein the antenna conductive element has an antenna length of about ¼ wavelength at a selected frequency and/or frequency bandwidth, and wherein the printed circuit board aperture is a generally horizontal slot disposed on an upper portion of the printed circuit board.

6. An antenna subassembly according to claim 4, wherein the antenna is configured to resonate at a selected frequency band that is about 1570 MHz to thereby provide GPS capability, and wherein the acoustic channel is an elongate channel that has a generally vertical orientation for at least a major portion of its length that turns into a generally horizontal portion proximate the printed circuit board aperture.

7. An antenna subassembly according to claim 1, wherein the acoustic channel is formed of a substrate material that is non-conductive, and wherein the antenna comprises a dielectric resonant antenna comprising a dielectric block element that is formed on and/or on a portion of the wall of the acoustic channel.

8. An antenna subassembly comprising an integrated antenna and acoustic channel having a resonant frequency of operation, comprising:
   an acoustic channel formed of substrate material, the acoustic channel having a wall with an enclosed space and an associated length and width, the acoustic channel adapted, during operation, to guide the output of a speaker to a target location;
   an antenna that is integrated with the acoustic channel, wherein the acoustic channel is formed of a substrate material that is non-conductive, and wherein the antenna comprises a conductive element formed on and/or in a portion of the wall of the acoustic channel; and
   a signal and ground feed configured to exit the acoustic channel and engage a printed circuit board, wherein the ground and signal feeds are positioned adjacent each other proximate a common side of the acoustic channel, wherein the acoustic channel has opposing first and second end portions, and wherein the antenna conductive element is positioned closer to the first end portion of the acoustic channel with the speaker in communication with the second end portion of the acoustic channel.

9. An antenna subassembly according to claim 8, wherein at least a portion of the antenna conductive element is formed directly onto the substrate of the acoustic channel.

10. A wireless terminal, comprising:
   (a) a housing with opposing forward and rearward primary surfaces configured to enclose a transceiver that transmits and receives wireless communications signals;
   (b) an acoustic channel having a wall with an enclosed space and an associated length and width with opposing first and second end portions, wherein the acoustic channel is configured as an elongate channel;
   (c) an antenna having an associated radiating element, wherein at least a portion of the element is in and/or on the acoustic channel;
   (d) a display screen having a perimeter disposed in the housing to be externally viewable from a forward primary surface of the housing;
   (e) a speaker in the housing in communication with the acoustic channel, the acoustic channel adapted, during operation, to guide the output of the speaker out of a forward location of the wireless terminal at a location that is outside the perimeter of the display.

11. A wireless terminal according to claim 10, wherein the elongate acoustic channel has a substantially tubular shape and has an upper portion that turns from a substantially vertical direction to a generally horizontal direction toward a forward surface of the wireless terminal.

12. A wireless terminal according to claim 10, wherein the elongate channel has a width that is less than about 10 mm.

13. A wireless terminal according to claim 12, wherein the elongate channel has a length that is less than about 50 mm.

14. A wireless terminal, comprising:
   (a) a housing configured to enclose a transceiver that transmits and receives wireless communications signals;
   (b) an acoustic channel having a wall with an enclosed space and an associated length and width with opposing first and second end portions;
   (c) an antenna having an associated radiating element, wherein at least a portion of the element is in and/or on the acoustic channel; and
   (d) a speaker in communication with the acoustic channel, the acoustic channel adapted, during operation, to guide the output of the speaker to a desired location in the housing, wherein the antenna has a conductive radiating element and is configured as a planar inverted F-antenna, wherein the antenna has an electrical length that is about a quarter wavelength, and wherein the speaker is positioned below the antenna.

15. A wireless terminal according to claim 14, wherein at least a portion of the antenna has a shape that substantially corresponds to a portion of the acoustic channel cavity shape.

16. A wireless terminal according to claim 14, further comprising a printed circuit board disposed within the housing with an acoustic channel aperture formed therein and having a signal feed and ground plane, wherein the antenna is operatively associated with the signal feed and ground plane, and wherein the antenna element in the acoustic channel defines a secondary antenna operating at a selected frequency, said wireless terminal further comprising a separate primary antenna spaced apart from the secondary antenna.

17. A wireless terminal according to claim 16, wherein the primary antenna is a planar inverted F-antenna having a plurality of resonant bandwidths that are different that the resonant bandwidth of the secondary antenna and is in communication with the signal feed and ground plane of the printed circuit board.

18. A wireless terminal according to claim 16, further comprising an antenna cavity positioned on a rear upper portion of the housing overlying and encasing the primary antenna and the acoustic channel with the secondary antenna therein.

19. A wireless terminal according to claim 18, wherein the acoustic channel is formed of a non-conductive substrate material, and wherein at least a portion of the secondary antenna element is disposed on a portion of the inner surface of the acoustic channel so that the secondary antenna element defines about a ¼ wave resonator at a selected frequency of operation.

20. A wireless terminal, comprising:
   (a) a housing configured to enclose a transceiver that transmits and receives wireless communications signals;
   (b) an acoustic channel having a wall with an enclosed space and an associated length and width with opposing first and second end portions;
   (c) an antenna having an associated radiating element, wherein at least a portion of the element is in and/or on the acoustic channel; and
   (d) a speaker in communication with the acoustic channel, the acoustic channel adapted, during operation, to guide the output of the speaker to a desired location in the housing wherein the antenna is configured as a dielectric resonating antenna with a dielectric radiating element, and wherein the speaker is positioned below the antenna.

21. A wireless terminal according to claim 20, wherein at least a portion of the antenna has a shape that substantially corresponds to a portion of the acoustic channel cavity shape.

22. A wireless terminal according to claim 20, further comprising a printed circuit board disposed within the housing with an acoustic channel aperture formed therein and having a signal feed, wherein the antenna is operatively associated with the signal feed, and wherein the antenna in the acoustic channel defines a secondary antenna operating at a selected frequency, said wireless terminal further comprising a separate primary antenna spaced apart from the secondary antenna.

23. A wireless terminal, comprising:
   (a) a housing configured to enclose a transceiver that transmits and receives wireless communications signals;
   (b) an acoustic channel having a wall with an enclosed space and an associated length and width with opposing first and second end portions;
   (c) an antenna having an associated radiating element, wherein at least a portion of the element is in and/or on the acoustic channel; and
   (d) a speaker in communication with the acoustic channel, the acoustic channel adapted, during operation, to guide the output of the speaker to a desired location in the housing, wherein the channel has a center portion that is an air gap, and wherein the antenna element has a major portion that is substantially planar and an edge portion that extends above or below the planar portion, and wherein at least a portion of the antenna element conforms to the shape of the acoustic channel.

24. A wireless terminal with two discrete internal antennas for multi-band operation, comprising:
 (a) a housing having opposing forward and rear portions, the housing configured to hold a transceiver that transmits and receives wireless communications signals;
 (b) an acoustic channel having a wall and an associated length and width, the acoustic channel positioned in the housing;
 (c) an antenna cavity disposed on the rear portion of the housing and positioned to overlie and enclose the acoustic channel;
 (d) a secondary antenna at least a portion of which is positioned in and/or on the acoustic channel and electrically connected with the transceiver;
 (e) a primary planar inverted F-antenna having a conductive element positioned in the housing antenna cavity and electrically connected with the transceiver; and
 (f) a speaker in communication with the acoustic channel, the acoustic channel adapted, during operation, to guide the output of the speaker to the forward portion of the housing.

25. A wireless terminal according to claim 24, wherein the secondary antenna comprises a planar inverted F-antenna having a conductive element with at least a portion of the conductive element positioned in and/or on the acoustic channel and electrically connected with the transceiver.

26. A wireless terminal according to claim 25, wherein the speaker is positioned below the secondary antenna, and wherein the secondary antenna conductive element is held encased by the acoustic channel and is configured so that at least a portion of the secondary antenna conductive element substantially conforms to the interior shape of the channel and allows acoustic transmission of the speaker to exit the acoustic channel.

27. A wireless terminal according to claim 24, wherein the secondary antenna comprises a dielectric resonator antenna having a dielectric block element with at least a portion of the element positioned in and/or on the acoustic channel and electrically connected with the transceiver.

28. A wireless terminal according to claim 27, wherein the speaker is positioned below the secondary antenna, and wherein the secondary antenna element is held encased by the acoustic channel and is configured so that at least a portion of the secondary antenna element substantially conforms to the interior shape of the channel and allows acoustic transmission of the speaker to exit the acoustic channel.

29. A method of operating a wireless terminal, comprising:
 transmitting sound from a speaker in the wireless terminal to outside the wireless terminal via an acoustic channel that comprises an integrated antenna, the acoustic channel extending generally longitudinally beneath a generally planar printed circuit board and rising to direct the sound to exit out an aperture in the planar printed circuit board and out a front side of the wireless terminal.

* * * * *